(12) United States Patent
Sakata

(10) Patent No.: US 6,377,977 B1
(45) Date of Patent: Apr. 23, 2002

(54) METHOD FOR LOADING APPLICATION PROGRAM AND OPENING FILES IN HOST TERMINALS BEFORE COLLABORATING ON A JOINT PROJECT

(75) Inventor: Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,468

(22) Filed: Apr. 28, 1999

(30) Foreign Application Priority Data

Apr. 28, 1998 (JP) ............................................ 10-118241

(51) Int. Cl.$^7$ ........................... G06F 15/177; G06F 9/54
(52) U.S. Cl. ............................... 709/205; 713/1; 717/11
(58) Field of Search ................................. 709/204, 205, 709/206, 227, 228, 320; 713/1; 717/11

(56) References Cited

U.S. PATENT DOCUMENTS

| | | | | |
|---|---|---|---|---|
| 5,195,130 A | * | 3/1993 | Weiss et al. ............. | 379/93.19 |
| 5,206,951 A | * | 4/1993 | Khoyi et al. ................. | 709/315 |
| 5,734,822 A | * | 3/1998 | Houha et al. ................ | 709/230 |
| 5,838,906 A | * | 11/1998 | Doyle et al. ................. | 709/202 |
| 5,909,545 A | * | 6/1999 | Frese, II et al. ............ | 709/208 |
| 6,138,140 A | * | 2/2000 | Yokote ........................ | 709/203 |
| 6,237,092 B1 | * | 5/2001 | Hayes et al. ................ | 713/100 |
| 6,263,377 B1 | * | 7/2001 | Monday et al. ............. | 709/230 |

FOREIGN PATENT DOCUMENTS

| | | |
|---|---|---|
| JP | 63-129455 | 6/1988 |
| JP | 4-213148 | 8/1992 |
| JP | 4-347733 | 12/1992 |
| JP | 5-250239 | 9/1993 |
| JP | 6-83785 | 3/1994 |
| JP | 6-348634 | 12/1994 |
| JP | 7-129373 | 5/1995 |
| JP | 7-210394 | 8/1995 |
| JP | 7-230425 | 8/1995 |
| JP | 8-44544 | 2/1996 |
| JP | 8-95880 | 4/1996 |
| JP | 8-249163 | 9/1996 |
| JP | 9-73424 | 3/1997 |
| JP | 9-305385 | 11/1997 |
| JP | 10-21059 | 1/1998 |
| JP | 10-27093 | 1/1998 |
| JP | 10-27095 | 1/1998 |

* cited by examiner

*Primary Examiner*—Dung C. Dinh
(74) *Attorney, Agent, or Firm*—Foley & Lardner

(57) ABSTRACT

In a local area network, at least one host terminal has an application program and operates as a source host and other host terminals operate as destination hosts. Each host terminal executes a file management program. The source host, when executing its file management program, updates its management table with an application name identifying the application program and a file name, and transmits a request message to the destination hosts. Each destination host, when executing its file management program, responds to the request message by acquiring the application program from the source host if the application program is nonexistent in the destination host and updates its management table with the application name and the file name. Each host terminal starts the application program by opening a file identified by the file name and collaborates on a joint project with other host terminals.

15 Claims, 7 Drawing Sheets

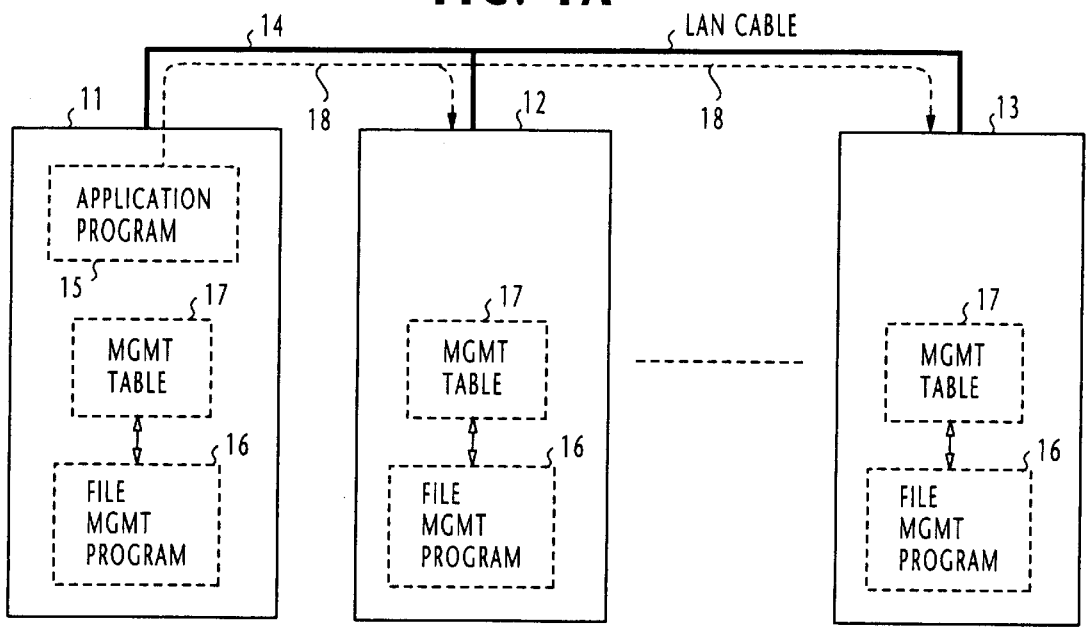
FIG. 1A
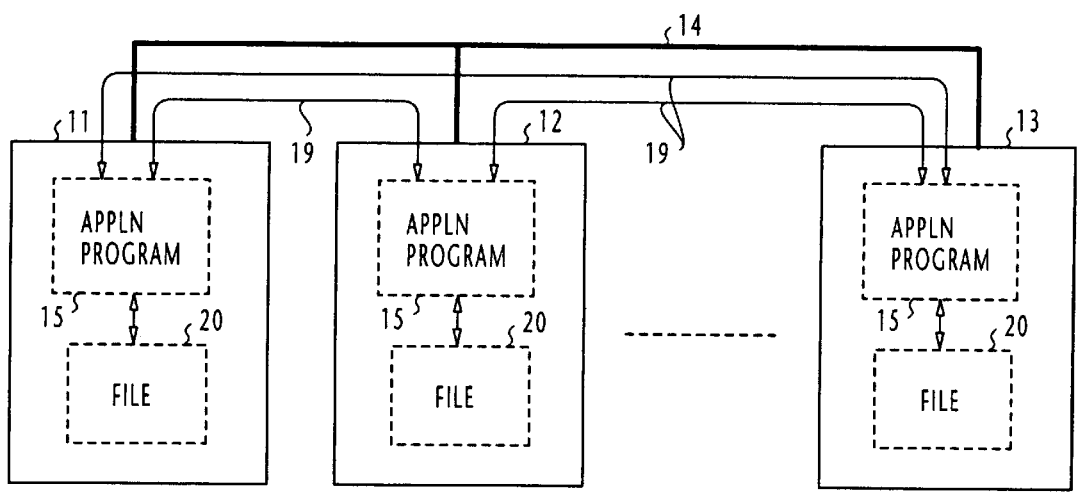
FIG. 1B
FIG. 2
MANAGEMENT TABLE
| APPLICATION NAME | FILE NAME | VERSION NO. |
|---|---|---|
|  |  |  |
| ⋮ | ⋮ | ⋮ |
|  |  |  |

SOURCE HOST

SOURCE HOST

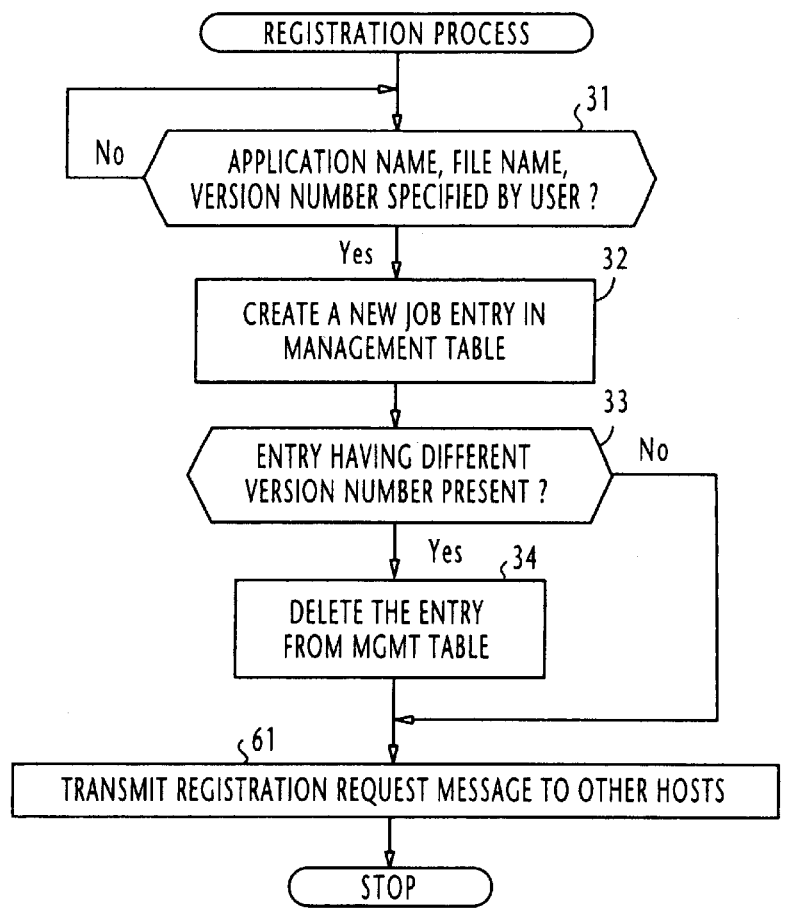
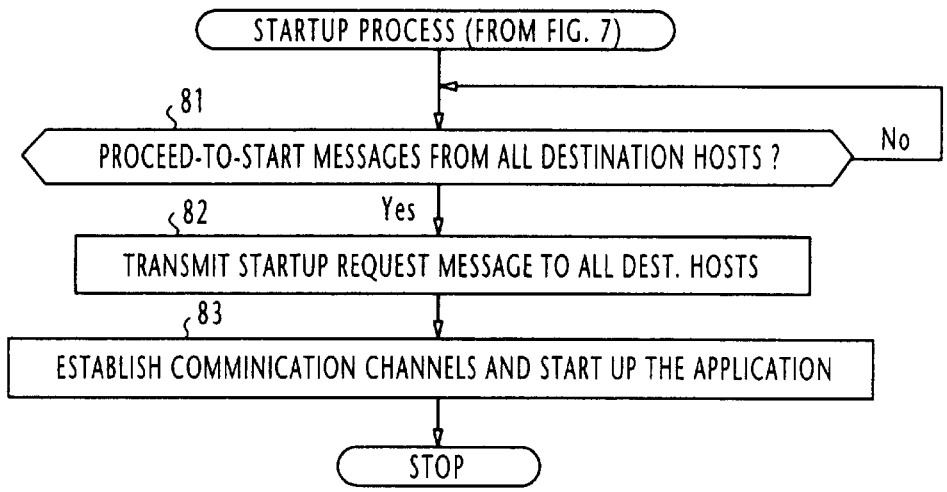

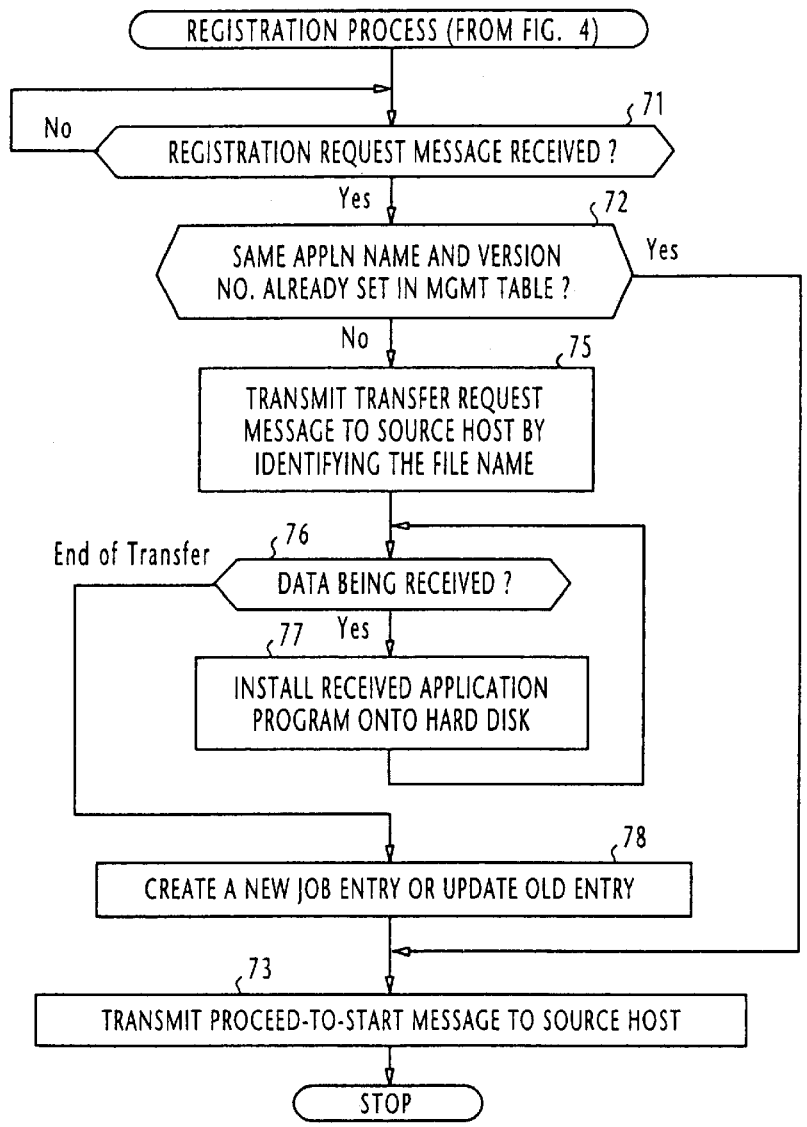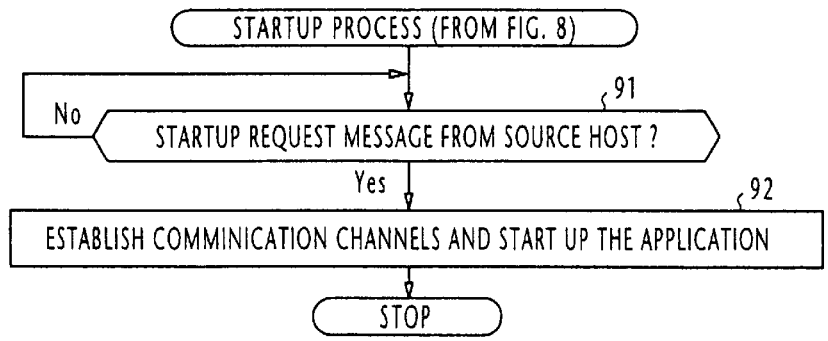

FIG. 10
| APPLICATION NAME | FILE NAME | VERSION NO. | REG. SOURCE HOST NAME | FLAG |
|---|---|---|---|---|
| | | | | |
| ⋮ | ⋮ | ⋮ | ⋮ | ⋮ |
| | | | | |
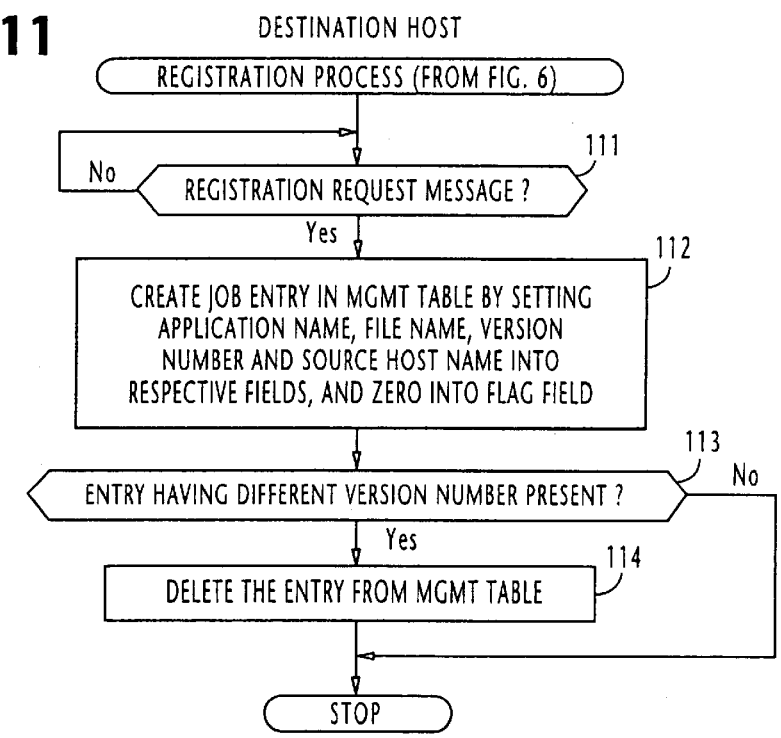
FIG. 11
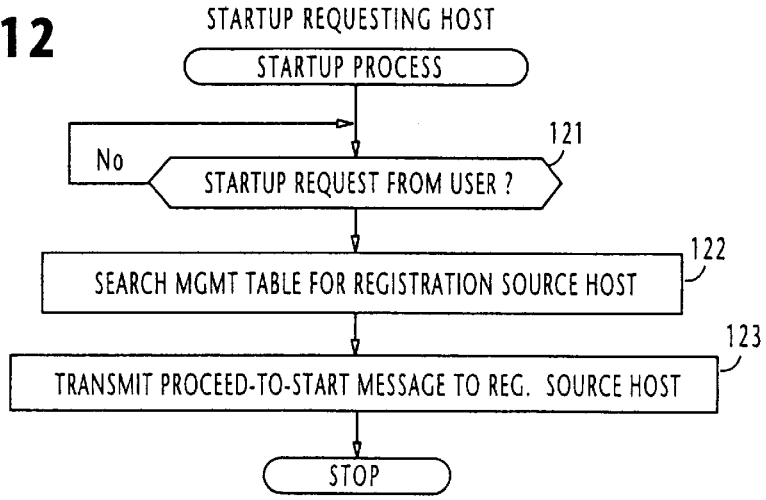
FIG. 12

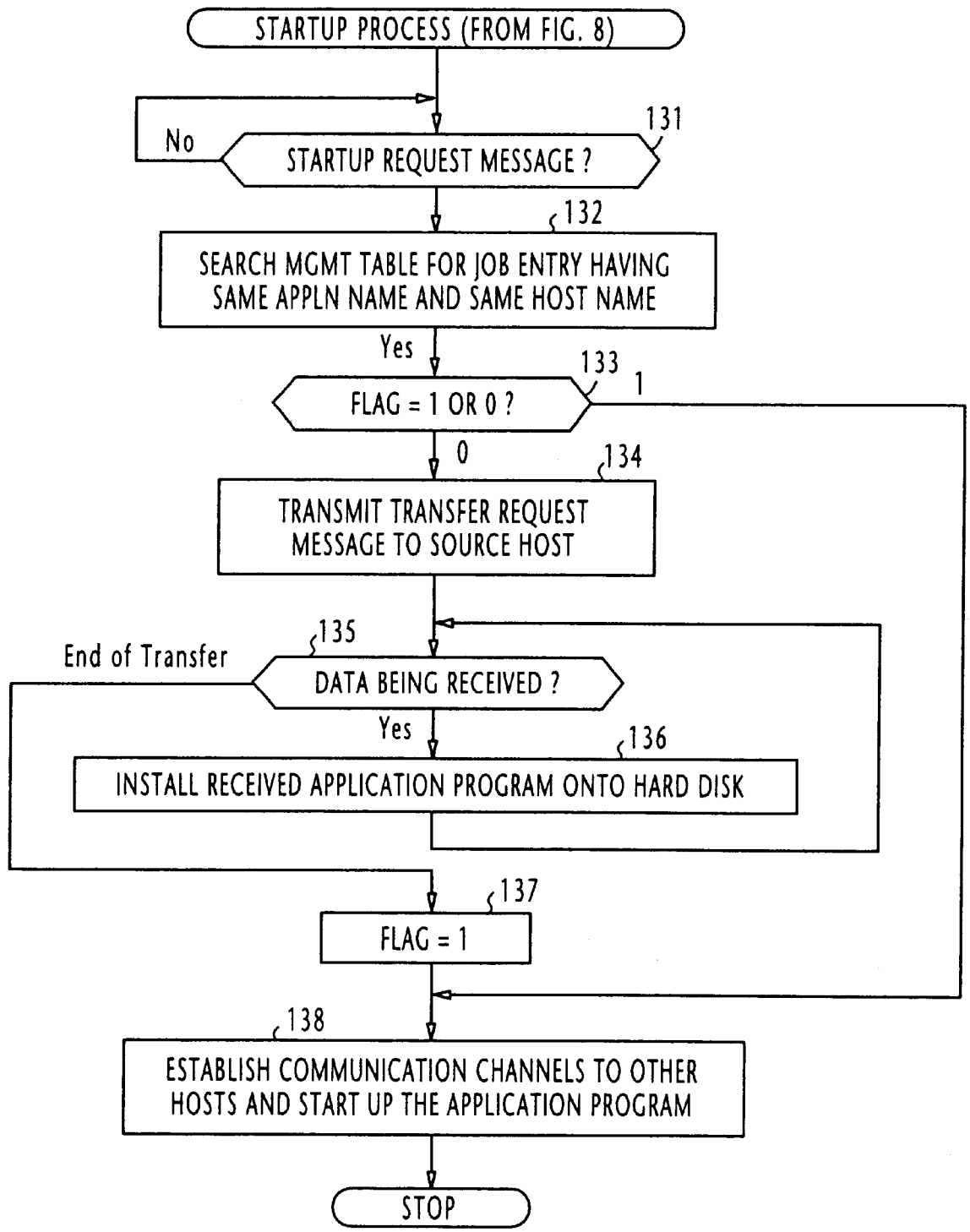

METHOD FOR LOADING APPLICATION PROGRAM AND OPENING FILES IN HOST TERMINALS BEFORE COLLABORATING ON A JOINT PROJECT

BACKGROUND OF THE INVENTION

1. Field of the Invention

The present invention relates to a local area network where a number of host terminal users collaborate on a joint project using an application program.

2. Description of the Related Art

Japanese Laid-Open Patent Specification Hei-6-83785 discloses a local area network in which a group of host computer terminals collaborate on a joint project by operating an application program and exchanging their results with each other so that each terminal holds an exact copy of the project. The application program, stored on each collaborating host terminal, includes a sequence of routines such as event presentation, event analysis, process execution and message communication.

However, before the host terminals start collaborating on a joint project, it is necessary to transfer files within the group as a preliminary routine, since old files resident in the individual terminals are, in most cases, not customized to the specific needs of a joint project and hence full and flexible utilization of the application program is not possible. This preliminary routine represents an extra work on the users at the host terminals.

A need therefore exists to reduce the amount of work currently performed by the computer terminal users before they collaborate on a joint project by eliminating the need to transfer files.

SUMMARY OF THE INVENTION

It is therefore an object of the present invention to provide a local area network which automatically loads an application program onto a group of host computer terminals to allow them to operate the application program by opening files of a specified file name before they start collaborating on a joint project.

According to a first aspect of the present invention, there is provided a local area network comprising plurality of interconnected host terminals each including a file management program and a management table. One of the host terminals having an application program operates as a source host and the other host terminals as destination hosts. The source host updates its management table with an application name identifying the application program and a file name, and transmits a request message to said destination hosts. Each destination host responds to the request message by acquiring the application program from the source host if the application program is nonexistent in the destination host and updates its management table with the application name and the file name. Each host terminal starts the application program by opening a file identified by the file name for collaborating on a joint project with other host terminals.

According to a second aspect, the present invention provides a storage medium for use in a plurality of interconnected host terminals. The storage medium contains a file management program for each of the host terminals, one of the host terminals having an application program being a source host and other host terminals being destination hosts. The file management program comprises the steps of (a) creating, in each of the host terminals, a management table, (b) updating the management table of the source host with an application name identifying the application program and a file name, and transmitting a request message from the source host to the destination hosts, (c) responsive to the request message at each of the destination hosts, acquiring the application program from the source host if the destination host has no possession of the application program and updating the management table thereof with the application name and the file name, and (d) starting the application program at all of the host terminals by opening a file identified by the file name in each of the terminals for collaborating on a joint project with other host terminals.

According to a third aspect, the present invention provides a file management method for use in a plurality of interconnected host terminals wherein one of the host terminals having an application program is a source host and other host terminals are destination hosts. The file management method comprises the steps of (a) creating, in each of the host terminals, a management table, (b) updating the management table of the source host with an application name identifying the application program and a file name, and transmitting a request message from the source host to the destination hosts (c) responsive to the request message at each of the destination hosts, acquiring the application program from the source host if the destination host has no possession of the application program and updating the management table thereof with the application name and the file name, and (d) starting the application program at all of the host terminals by opening a file identified by the file name in each of the terminals for collaborating on a joint project with other host terminals.

BRIEF DESCRIPTION OF THE DRAWINGS

The present invention will be described in further detail with reference to the accompanying drawings, in which:

FIG. 1A is a block diagram of a local area network in which a number of host computer terminals are shown to co-operate for the preparation of a file using a file management program of the present invention via a LAN cable before they start collaborating on a common project using a specified application program;

FIG. 1B is a block diagram of the local area network where a group of host terminals are ready to start using the specified application program to produce results of a collaborated job on files by exchanging data over logical channels established on the LAN cable;

FIG. 2 is an illustration of a management table created in each host computer terminal;

FIG. 6 is a flowchart of the operation of a host computer terminal when functioning as a source host during a registration process according to a second embodiment of the present invention;

FIG. 7 is a flowchart of the operation of a host computer terminal functioning as a destination host during a registration process according to the second embodiment of the present invention;

FIG. 8 is a flowchart of the operation of the source host of FIG. 6 during a startup process according to the second embodiment of the present invention;

FIG. 9 is a flowchart of the operation of the destination host of FIG. 7 during a startup process according to the second embodiment of the present invention;

FIG. 10 is an illustration of a management table created in each host computer terminal according to a third embodiment of the present invention;

FIG. 11 is a flowchart of the operation of a host computer terminal functioning as a destination host during a registration process according to the third embodiment of the present invention;

FIG. 12 is a flowchart of the operation of a host computer operating as a startup source host of the third embodiment for requesting the registration source host to initiate a startup process; and FIG. 13 is a flowchart of the operation of the destination host of FIG. 11 during the startup process of the third embodiment.

DETAILED DESCRIPTION

Figure 3:
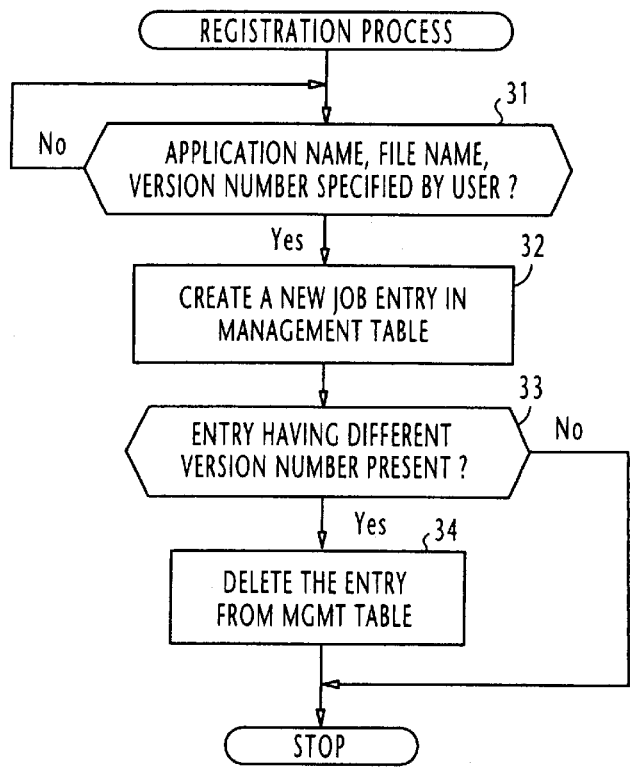
FIG. 3 is a flowchart of the operation of a host computer terminal when functioning as a source host during a registration process according to a first embodiment of the present invention.

Referring now to FIG. 1A, there is shown a local area network according to the present invention. The network comprises a plurality of host computer terminals 11, 12, 13 interconnected by a LAN (local area network) cable 14. The host terminals form a group of user terminals for collaborating on a common project, such as preparation of presentations, documents, and manuals, via logical communication channels established on the LAN cable 14. An application program 15 shared by the collaborating host terminals is installed on a storage medium at one of the host terminals, such as host terminal 11.

Each host terminal has on storage medium a file management program 16 of the present invention to operate its microprocessor to proceed with the management of file data necessary for the users before they start using the application program 15. The file management program of this invention can also be stored on any type of removable storage medium and transferred to any location of the network.

Each host terminal has a management table 17 for making a registration of data identifying a file associated with the common job. As shown in FIG. 2, the management table has a plurality of job entries 21 for respectively storing file identification data. A job is identified by an application name representing an application program used by the collaborating host terminals for performing a job, a file name and a version number identifying the version of the application program. Each job entry is divided into a plurality of fields 22, 23 and 24 for respectively setting the application and file names and the version number.

When the users collaborate on a common job using a given application program, one of the host terminals serves a source host where the given application program is stored and the others act as destination hosts for receiving the program from the source host.

In a first embodiment of this invention, there is only one fixed and predetermined source host. Before a group of users begins collaborating on a job, the source host specifies an application program to use for the job and proceeds with registration of the program in a management table by setting file identification data. Following the registration process at the source host, a startup process is initiated by the source host.

The operation of the first embodiment of this invention will be described with the aid of flowcharts shown in FIGS. 3, 4 and 5.

In FIG. 3, the user at the source host starts a registration process by specifying an application name, a file name and a version number on the keyboard (step 31). In response, the file management program at the source host terminal updates its management table either by creating a new job entry or updating an old job entry with the specified application name identifying an application program to be used for collaborating on a job and the specified file name and the version number of the program (step 32). Flow proceeds to step 33 to check to see if there is an old job entry having the same application name as and a different version number from those contained in the received request message. If this is the case, flow proceeds to step 34 to delete that old entry from the management table before terminating the routine; otherwise, flow proceeds to the end of the routine.

Figure 4:
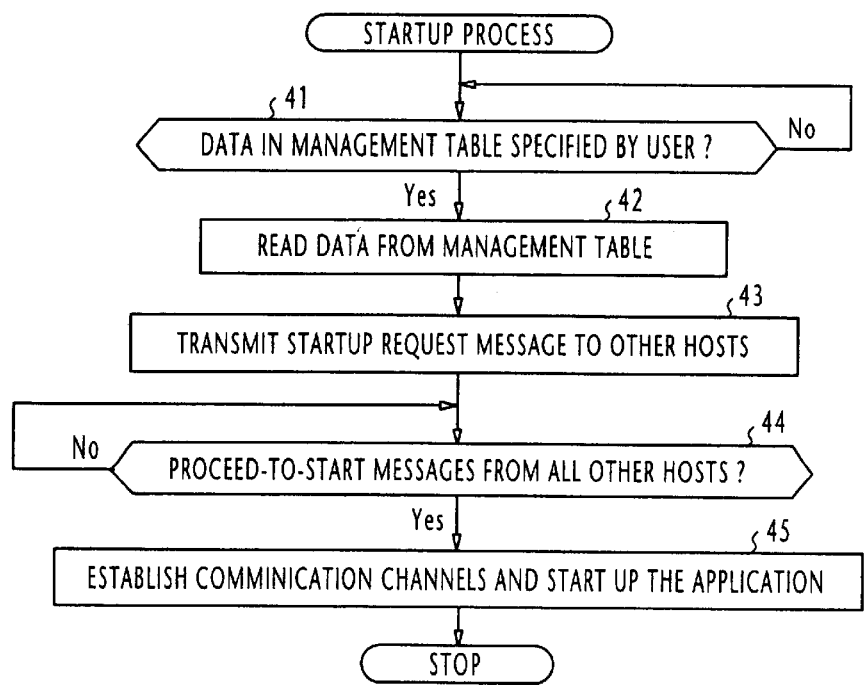
FIG. 4 is a flowchart of the operation of the source host during a startup process according to the first embodiment of the present invention.

In FIG. 4, the user at the source host then begins a startup process by specifying an application name (step 41). In response, the source host reads data from the job entry of its management table that corresponds to the specified application name (step 42). The source host then formulates and transmits a startup request message to the other hosts (step 43) and waits for a proceed-to-start message from all destination hosts. The startup message contains the data stored in the corresponding entry of the management table.

Figure 5:
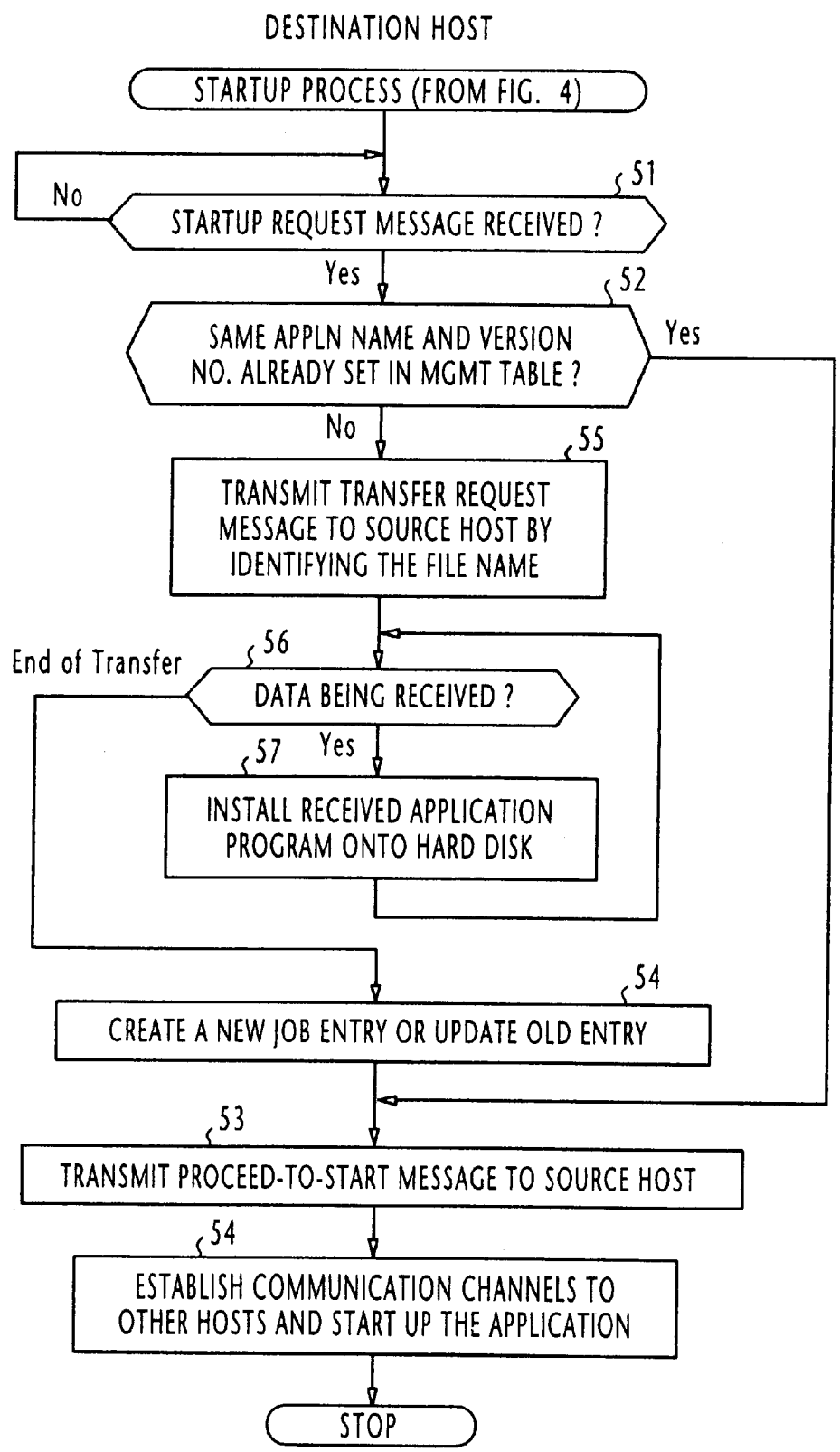
FIG. 5 is a flowchart of the operation of a host computer terminal when functioning as a destination host during a startup process according to the first embodiment of the present invention.

In FIG. 5, each destination host responds to the startup request message from the source host by initiating a startup process at step 51. At step 52, the destination host checks to see if the application name and the version number specified in the startup request message are already set in its management table.

If the specified data is already set in the management table of the destination host, the decision at step 52 is affirmative and flow proceeds to step 53 to transmit a proceed-to-start message to the source host, indicating that the destination host is ready to start the application program. The destination host proceeds to step 54 to establish logical communication channels to other hosts and start the specified application program.

If the application (program) name of the same version number is not set in the management table, flow proceeds from step 52 to step 55 to transmit a transfer request message to the source host, indicating the specified file name. In response, the source host starts transferring the specified application program to the requesting destination host. At step 56, the requesting destination host checks to see if the requested program data is being received. If the decision at step 56 is affirmative, flow proceeds from step 56 to step 57 to install the received application program onto its hard disk. Steps 56 and 57 are repeatedly executed so that, at the end of program transfer, flow proceeds from step 56 to step 54 to transmit a proceed-to-start message to the source host. In this way, the application program 15 is loaded from the source host into all other hosts, as indicated by dotted lines 18 in FIG. 1A.

Returning to FIG. 4, when the source host has received proceed-to-start messages from all destination hosts (step 44), flow proceeds to step 45 to establish logical communication channels 19 through the LAN cable 14 to other hosts and start up the application program as shown in FIG. 1B. The source host is now able to broadcast a command message to all destination hosts to start collaborating on a job, using the application program specified in the corresponding job entry of the management table and the identification data contained therein.

It is seen from FIG. 1B that all host terminals have the possession of the application program 15 and logical channels 19 are established. Host terminals 11, 12, 13 start the application program 15 by opening files 20 with the file name specified in a job entry of their management tables corresponding to the application program and start collaborating with each other on a joint project.

A second embodiment of this invention is shown in FIGS. 6, 7, 8 and 9. The second embodiment differs from the previous embodiment in that, following the registration process at the source host, a registration request message is sent from the source host to all destination hosts. After all destination hosts have completed their registration process and the source host is notified of this fact, a startup process is initiated by the source host.

In FIG. 6, the operation of the source host is similar to that of FIG. 3 with the exception that it includes additional step 61, following step 34, to transmit a registration request message to all destination hosts, so that all destination hosts can proceed to initiate a registration process in FIG. 7, instead of initiating the startup process of FIG. 5.

In FIG. 7, each destination host responds to the registration request message from the source host by initiating a registration process at step 71. At step 72, the destination host checks to see if the application name and the version number specified in the registration request message are already set in its management table.

If the specified data is already set in the destination's management table, flow proceeds to step 73 to transmit a proceed-to-start message to the source host and terminates the registration process.

If the decision at step 72 is negative, flow proceeds to step 74 to transmit a transfer request message to the source host, identifying the file name. In response, the source host starts transferring the specified application program to the requesting destination host. At step 75, the requesting destination host checks to see if the requested program data is being received. If so, flow proceeds to step 76 to install the received application program onto its hard disk. Steps 75 and 76 are repeatedly executed so that, at the end of program transfer, flow proceeds from step 75 to step 77 to create new job entry in the management table by setting the data specified in the startup request message. In this way, all the destination host terminals are ready to start the specified application program.

The source host is now able to broadcast a startup request message to all destination hosts to start using the application program 15.

In FIG. 8, when the source host has received proceed-to-start messages from all destination hosts (step 81), flow proceeds to step 82 to transmit a startup request message to all destination hosts.

In FIG. 9, each destination host receives the startup request message from the source host at step 91 and establishes logical communication channels to other hosts and starts the application program (step 92).

A third embodiment of this invention is shown in FIGS. 10 to 13. In this embodiment a first source host initiates a registration process and a second source host, which may be different from the first source host, can initiate a startup process by making a search through the management table for the first source and then sending to it a proceed-to-start message.

In FIG. 10, the job entry 101 of this management table includes a registration source host name field 105 and a flag field 106 in addition to the application name field 102, the file name field 103 and the version number field 104.

In this modification, the operation of source hosts during registration and startup processes is the same manner as the second embodiment (FIGS. 6 and 8).

As shown in FIG. 11, each destination host starts its file management program when it receives a registration request message from a source host (step 111). Flow proceeds to step 112 to update the management table either by creating a new job entry or updating an old job entry with the application name, file name, version number and registration source host name specified in the received registration request message and setting a "0" into the flag field 106. At step 113, the destination host checks to see if there is an old entry having the same application name but different version number. If so, that old entry is deleted from the management table (step 114). Following step 114 or a negative decision at step 113, the destination host terminates the routine.

With the management tables of all host terminals being updated with registration data transmitted from a first host terminal, a second host terminal operates as a startup requesting host to initiate a startup process by urging the first host terminal to send a startup request message.

In FIG. 12, the startup requesting host initiates a startup process if a startup request is entered by the user (step 121). Flow proceeds to step 122 to look up the management table for a registration source host name set in the host name field 105. At step 123, the startup requesting host transmits a proceed-to-start message to the registration host identified by the host name field 105.

The registration host responds to this proceed-to-start message (step 81, FIG. 8) with a startup request message sent to all destination hosts as well as to the second source host.

In FIG. 13, each destination host receives this broadcast startup request message at step 131 and proceeds to step 132 to search through the management table for an entry having the same application name and registration source host name as those specified in the startup request message. At 133, the flag field of the identified job entry is checked to see if it is set to "1" or "0". If a "1" is set, it is determined that the destination host has already installed the application program on its hard disk. In this case, flow proceeds from step 133 to step 138 to establish logical communication channels to other hosts and start up the application program, and proceeds to the end of the routine. If a "0" is set in the flag field, it is determined that the specified application program is not installed on the hard disk of the destination host. Therefore, at step 134, a transfer request message is sent from the destination host to the first source host. Steps 135 and 136 are repeatedly executed to install the application program from the first source host onto the hard disk. At the end of transfer, flow proceeds from step 135 to step 137 to set the flag to "1" and proceeds to step 138.

If the host terminal 11 operates as a source host for initiating a registration process and the host terminal 12 as a startup requesting host, a proceed-to-start message is sent from host terminal 12 to host terminal 11 following the registration process and the application program is transferred from host terminal 11 to host terminals 12 and 13.

What is claimed is:

1. A local area network comprising:
a plurality of interconnected host terminals each including a file management program and a management table, wherein one of the host terminals having an application program operates as a source host and other host terminals operating as destination hosts, and each of said host terminals executes the file management program, the source host updating the management table thereof an application name identifying said application program and a file name, and transmitting a request message to said destination hosts, each of the destination hosts responding to said request message by acquiring said application program from the source host if said application program is nonexistent in the destination host and updating the management table thereof with said application name and said file name, each of said host terminals starting the application program by opening a file identified by said file name for collaborating on a joint project with other host terminals.

2. A local area network comprising:

a plurality of interconnected host terminals each having a file management program and a management table, wherein one of said host terminals having an application program operates as a source host and other host terminals as destination hosts, and each of said host terminals executing the file management program thereof, the source host updating the management table thereof with an application name identifying said application program and a file name, and transmitting a startup request message to said destination hosts, each of the destination hosts responding to said startup request message by acquiring said application program from the source host if said application program is nonexistent in the destination host, updating the management table thereof with said application name and said file name, transmitting a proceed-to-start message to the source host, and starting the application program thereof using a file identified by said file name, said source host responding to the proceed-to-start messages from all the destination hosts for starting the application program thereof by opening a file identified by said file name for collaborating on a joint project with other host terminals.

3. A local area network comprising:

a plurality of interconnected host terminals each having a file management program and a management table, wherein one of said host terminals having an application program operates as a source host and other host terminals as destination hosts, and each of said host terminals executes the file management program thereof before using said application program, the source host updating the management table thereof with an application name identifying said application program and a file name, and transmitting a registration request message to said destination hosts, each of the destination hosts responding to said registration request message by acquiring said application program from the source host if said application program is nonexistent in the destination host and updating the management table thereof with said application name and said file name, said source host transmitting a startup request message to said destination hosts, and starting the application program thereof by opening a file identified by said file name, each of the destination hosts responding to the startup request message from the source host for starting the application program thereof by opening a file identified by said file name for collaborating on a joint project with other host terminals.

4. A local area network as claimed in claim 3, wherein each of said destination hosts is arranged to transmit a proceed-to-start message to said source host immediately after the management table thereof is updated, and wherein said source host is arranged to respond to the proceed-to-start messages from all the destination hosts to transmit said startup request message to said destination hosts.

5. A local area network as claimed in claim 3, wherein one of said destination hosts is arranged to transmit a proceed-to-start message to said source host after the management table thereof is updated, and wherein said source host is arranged to respond to the proceed-to-start message from said one destination host to transmit said startup request message to all of said destination hosts.

6. A storage medium for a plurality of interconnected host terminals, the medium containing a file management program for each of said host terminals, one of said host terminals having an application program being a source host and other host terminals being destination hosts, said file management program comprising the steps of:

a) creating a management table in each of said host terminals;

b) updating the management table at said source host with an application name identifying said application program and a file, and transmitting a startup request message from the source host terminal to the destination hosts;

c) responsive to said startup request message at each of said destination hosts, acquiring an application program from the source host if the destination host has no possession of said application program, updating the management table thereof with said application name and said file name, transmitting a proceed-to-start message to the source host, and starting the application program by opening a file identified by said file name; and d) responsive to said proceed-to-start messages from all destination host terminals, starting the application program at the source hot by opening a file identified by said file name for collaborating on a joint project with other host terminals.

7. A storage medium for a plurality of interconnected host terminals, the medium containing a file management program for each of said host terminals, one of said host terminals having an application program being a source host and other host terminals being destination hosts, said file management program comprising the steps of:

a) creating a management table at each of said host terminals;

b) updating the management table at said source host with an application name identifying said application program and a file name, and transmitting a registration request message from the source host to said destination hosts;

c) responsive to said registration request message at each of said destination host terminals, acquiring an application program from the source host if the destination host does not have possession of said application program and updating the management table thereof with said application name and said file name;

d) transmitting a startup request message from said source host to said destination host terminals and starting the application program at said source host by opening a file identified by said file name; and e) responsive to said startup request message, starting the application program at each of said destination hosts by opening a file identified by said file name for collaborating on a joint project with other host terminals.

8. A storage medium as claimed in claim 7, wherein the step (c) further comprises the step of transmitting a proceed-to-start message from each of said destination hosts to said source host when the management table thereof is updated, and the step (d) further comprises the step of responding to the proceed-to-start messages from all the destination hosts for transmitting said startup request message to all of said destination hosts.

9. A storage medium as claimed in claim 7, further comprising the step of transmitting a proceed-to-start message from one of said destination hosts to said source host after step (c), and wherein the step (d) further comprises the step of responding to the proceed-to-start message from said one destination host for transmitting said startup request message to all of said destination hosts.

10. A file management method as claimed in claim 7, wherein the step (c) further comprises the step of transmitting a proceed-to-start message from each of said destination hosts to said source host when the management table thereof is updated, and the step (d) further comprises the step of responding to the proceed-to-start messages from all the destination hosts for transmitting said startup request message to all of said destination hosts.

11. A file management method as claimed in claim 7, further comprising the step of transmitting a proceed-to-start message from one of said destination hosts to said source host after the step (c), and wherein the step (d) further comprises the step of responding to the proceed-to-start message from said one destination host for transmitting said startup request message to all of said destination hosts.

12. A storage medium for a plurality of interconnected host terminals, the medium containing a file management program for each of said host terminals, one of said host terminals having an application program being a source host and other host terminals being destination hosts, said file management program comprising the steps of:

a) creating, in each of said host terminals, a management table;

b) updating the management table of said source host with an application name identifying said application program and a file name, and transmitting a request message from the source host to the destination hosts;

c) responsive to said request message at each of said destination hosts, acquiring the application program from the source host if the destination host has no possession of said application program and updating the management table thereof with said application name and the file name; and d) starting the application program at all of said host terminals by opening a file identified by said file name in each of the terminals for collaborating on a joint project with other host terminals.

13. A file management method for each of a plurality of interconnected host terminals wherein one of said host terminals having an application program is a source host and other host terminals are destination hosts, said file management method comprising the steps of:

a) creating, in each of said host terminals, a management table;

b) updating the management table of said source host with an application name identifying said application program and a file name, and transmitting a request message from the source host to the destination hosts;

c) responsive to said request message at each of said destination hosts, acquiring the application program from the source host if the destination host has no possession of said application program and updating the management table thereof with said application name and the file name; and d) starting the application program at all of said host terminals by opening a file identified by said file name in each of the terminals for collaborating on a joint project with other host terminals.

14. A file management method for each of a plurality of interconnected host terminals wherein one of said host terminals having an application program is a source host and other host terminals are destination hosts, said file management method comprising the steps of:

a) creating a management table in each of said host terminals;

b) updating the management table at said source host with an application name identifying said application program and a file, and transmitting a startup request message from the source host terminal to the destination hosts;

c) responsive to said startup request message at each of said destination hosts, acquiring an application program from the source host if the destination host has no possession of said application program, updating the management table thereof with said application name and said file name, transmitting a proceed-to-start message to the source host, and starting the application program by opening a file identified by said file name; and d) responsive to said proceed-to-start messages from all destination host terminals, starting the application program at the source hot by opening a file identified by said file name for collaborating on a joint project with other host terminals.

15. A file management method for each of a plurality of interconnected host terminals wherein one of said host terminals having an application program is a source host and other host terminals are destination hosts, said file management method comprising the steps of:

a) creating a management table at each of said host terminals;

b) updating the management table at said source host with an application name identifying said application program and a file name, and transmitting a registration request message from the source host to said destination hosts;

c) responsive to said registration request message at each of said destination host terminals, acquiring an application program from the source host if the destination host does not have possession of said application program and updating the management table thereof with said application name and said file name;

d) transmitting a startup request message from said source host to said destination host terminals and starting the application program at said source host by opening a file identified by said file name; and e) responsive to said startup request message, starting the application program at each of said destination hosts by opening a file identified by said file name for collaborating on a joint project with other host terminals.

* * * * *